United States Patent [19]
Földi

[11] Patent Number: 6,095,696
[45] Date of Patent: Aug. 1, 2000

[54] DEVICE FOR OPTICAL CONNECTION OF AN OPTICAL FIBRE, WITH ANOTHER OPTICAL ELEMENT

[75] Inventor: Peter Földi, Forsheda, Sweden

[73] Assignee: Formex AB, Anderstorp, Sweden

[21] Appl. No.: 09/073,339

[22] Filed: May 5, 1998

[30] Foreign Application Priority Data

Jul. 18, 1997 [SE] Sweden .................................. 9702754

[51] Int. Cl.[7] ....................................................... G02B 6/36
[52] U.S. Cl. .................................................. 385/79; 385/88
[58] Field of Search ................................ 385/76–79, 31, 385/33, 88

[56] References Cited

U.S. PATENT DOCUMENTS

| | | | |
|---|---|---|---|
| 4,451,115 | 5/1984 | Nicia et al. ................................ | 385/74 |
| 5,247,595 | 9/1993 | Foldi ......................................... | 385/78 |
| 5,778,124 | 7/1998 | Nedstedt ................................... | 385/79 |
| 5,971,627 | 10/1999 | Nedstedt ................................... | 385/61 |

FOREIGN PATENT DOCUMENTS 0759568  3/1997  European Pat. Off. .

*Primary Examiner*—Akm E. Ullah
*Attorney, Agent, or Firm*—Baker & Daniels

[57] ABSTRACT

A device for optical connection of an optical fiber (2) with a lens (4) comprises a substantially sleeve-shaped retainer (6) and a connector element (10). The optical fiber (2) is fixed in the retainer (6), and the retainer has an end surface (8) at which the end surface of the optical fiber is intended to be positioned. The connector element has an engagement surface (12) intended to engage the end surface of the retainer, said engagement surface being constituted by a funnel-shaped surface tapering from the end surface of the retainer. (FIG. 1a)

20 Claims, 2 Drawing Sheets

DEVICE FOR OPTICAL CONNECTION OF AN OPTICAL FIBRE, WITH ANOTHER OPTICAL ELEMENT

FIELD OF THE INVENTION

The present invention relates to a device for optical connection of an optical fibre with another optical element, for example a lens.

BACKGROUND OF THE INVENTION

In fibre optical systems there are at different points required optical connections between the different optical elements included in the system. Thus, there are required optical connections between different lengths of optical fibres, between an optical fibre and a light source, for example a diode, between an optical fibre and a light detector etc. Each connection must be established while using very great accuracy if the losses shall be kept at a minimum. Of course, the problem of providing a correct connection is emphasized by the fact that optical fibres have a very small cross sectional area and that also small deviations from a correct position between two fibre end portions which shall be connected with each other cause substantial losses. It is important especially to avoid angular deviations between the fibres, i.e. it is important that the fibres which are connected with each other are positioned on is the same optical axis.

Different devices for providing a correct connection of optical fibres with each other and with other optical elements have been suggested. Such previously known devices comprise lens systems in which the light beam is magnified so that the light transmission in the connection takes place at a sectional area which is magnified several times providing for a corresponding reduction of the sensitivity to deviations from the correct position. Thereby, it is a drawback that the connection of two fibre end portions to each other requires instead of one single connection, i.e. the connection between the fibre end portions, an optical connection of the fibre end portions to one lens each and an optical connection of the lenses to each other, i.e. three connections. Thereby, it is important that the optical fibres and the lenses are positioned on the same optical axis as well as that the end surfaces of the fibres are positioned in the focus of the lens in question. Thus, the connections between the optical fibres and the lenses constitute the most sensitive parts of the connection system while the optical connection of the lenses to each other can easily be provided without errors.

A previously known device for optical connection of an optical fibre with another optical element, preferably a lens, comprises a substantially sleeve-shaped retainer and a connector element. The sleeve-shaped retainer is intended for fixing the optical fibre in a predetermined position in relation to reference surfaces formed on the retainer and including an end surface of the retainer at which the end surface of the optical fibre is intended to be positioned. The connector element is provided with engagement surfaces adapted to engage the reference surfaces of the retainer for defining the position of the retainer and thereby the optical fibre in relation to the device, the engagement surfaces of the retainer comprising an engagement surface adapted to engage the end surface of the retainer. In addition thereto the connector element has a surface for defining the position of the other optical element, for example the lens, in relation to the end surface of the retainer.

SUMMARY OF THE INVENTION

The object of present invention is to provide a device of said kind, in which the determination of the position of the end surface of the retainer in relation to the engagement surfaces of the connector element and thereby in relation to the other optical element, for example the lens, presents greater accuracy than in previously known devices of said kind, so that the losses in the connection between the optical fibre and the other optical element, for example the lens, are reduced to a minimum.

In order to comply with this object the device according to the invention is characterized in that the engagement surface of the connector element adapted to engage the end surface of the retainer is constituted by a funnel-shaped surface tapering from the end surface of the retainer.

This design of the engagement surface of the connector element makes it possible to provide an exactly defined position of the retainer and thereby of the optical fibre in the connector element with regard to the position in axial direction as well as with regard to the position in radial direction. The funnel-shaped surface can be of conical design or can be of convex design. If the funnel-shaped surface is of conical design it is preferred that the surface has a cone angle exceeding 90° and for example has a cone angle of about 172°.

The end surface of the retainer intended to engage the engagement surface of the connector element is preferably of spherical shape providing that the engagement between the end surface of the retainer and the funnel-shaped engagement surface of the connector element is given the shape of an annular, narrow, substantially line-shaped engagement surface.

The end surface of the retainer engaging the engagement surface of the connector element can also be of flat design and thereby, this flat surface preferably has an outer edge portion formed with a radius, said edge portion thereby constituting the part of the end surface of the retainer, which engages the funnel-shaped surface of the connector element.

The connector element has also a surface for defining the position of the other optical element, for example the lens, in relation to the end surface of the retainer, and this surface for defining the position of the other optical element is suitably constituted by a circular edge surface formed with a radius.

Figure 1A:
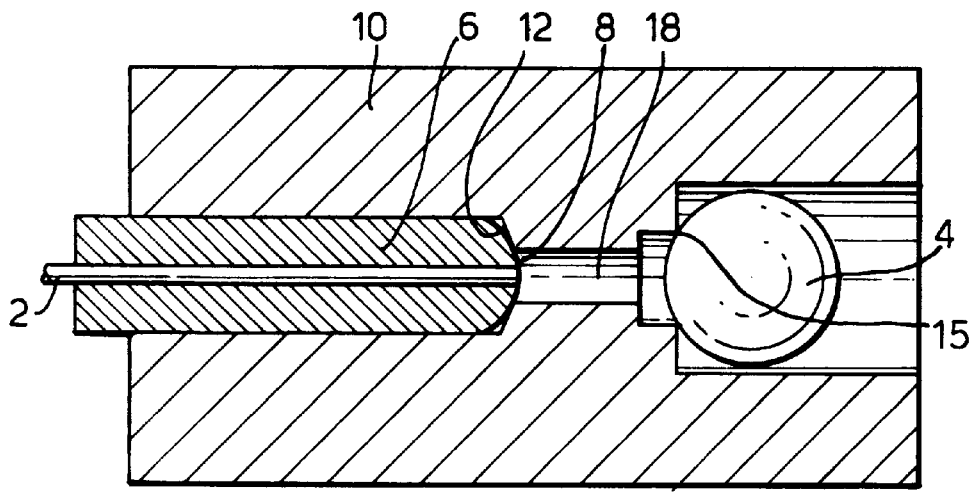
FIG. 1a is an axial section of a device according to the invention for connecting an optical fibre with a spherical lens.

The device according to the invention is adapted to be included a system for connecting an optical fibre with another optical fibre, in which system the optical fibres are connected with one lens each, so that the transmission of the light between the optical elements takes place through the lenses. The embodiment of a device according to the invention schematically shown in section in FIG. 1a is used for connecting an optical fibre 2 with a spherical lens 4. The end portion of the optical fibre 2 is enclosed in a fibre retainer 6 designed as a sleeve. The fibre retainer 6 is cylindrical along the main portion of its outer surface and has at its right end in the figure a spherical reference surface 8.

The optical fibre 2 is fixed in the fibre retainer 6 in a manner known per se, for example by means of an adhesive, the end surface of the optical fibre 2 being positioned in the same plane as the spherical end surface 8 of the retainer 6. A correct position of the end surface of the optical fibre 2 can be provided by fixing the fibre with the end portion thereof projecting somewhat outside the spherical end surface 8, whereupon the fibre is ground to the plane of the end surface 8. When the end surface of the fibre 2 is positioned in the plane of the spherical end surface 8, the end surface of the fibre 2 will be related to the spherical reference surface 8 in a predetermined way.

The device for optical connection of the optical fibre 2 with the spherical lens 4 comprises in addition to the retainer 6 a connector element 10. The connector element 10 is provided with surfaces for determining the relative position between the retainer 6 and thereby the optical fibre 2 and the spherical lens 4. The surface of the connector element 20 for defining the position of the fibre retainer 6 and thereby the optical fibre 2 is constituted by a funnel-shaped engagement surface 12 tapering in the direction from the retainer 6.

Figure 1B:
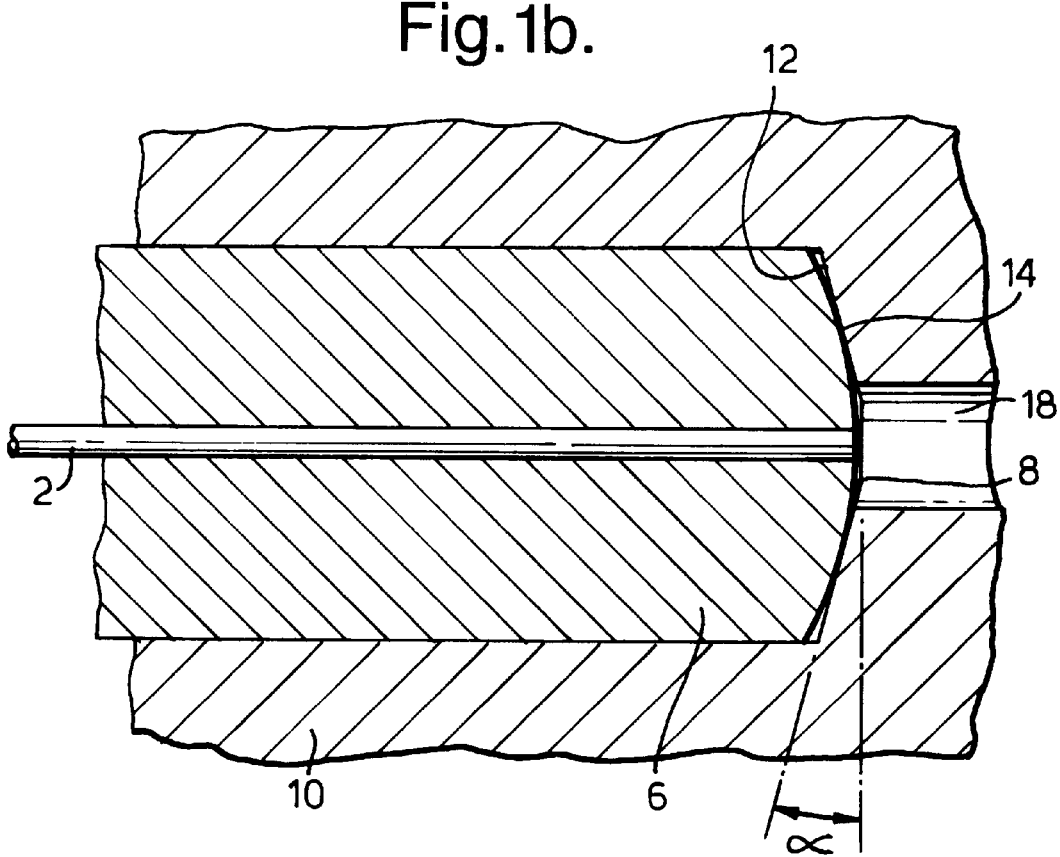
FIG. 1b is a detail of the device according to FIG. 1a on an enlarged scale.

In the embodiment according to FIGS. 1a and 1b the engagement surface 12 is of conical design having an angle a according to FIG. 1b of 3–4°, i.e. a cone angle of 172–174°. As a consequence of the spherical design of the end surface 8 of the retainer 6 and the conical design of the engagement 12 of the connector element 10 the retainer 6 will at its end surface 12 engage the engagement surface 12 of the connector element 10 along an annular, narrow, substantially line-shaped engagement surface 14 forming an extremely well defined engagement position for the retainer 6 in the connector element 10.

The surface for defining the position of the spherical lens 4 in the connector element 10 and thereby for defining the relative position between the optical fibre 2 and the spherical lens 4 is constituted by a circular edge surface 16 formed with a radius. The circular edge surface is formed with a radius of about 0.25 mm and provides an extremely accurate determination of the position of the spherical lens 4 without damaging the surface of the spherical lens by subjecting the surface to too great stresses.

The fibre retainer 6 and the spherical lens 4 are maintained in firm engagement with the conical engagement surface 12 and the edge surface 16 formed with a radius, respectively, by means of arrangements not shown in detail. In respect of the fibre retainer 6 these arrangements can be constituted by a conventional nut sleeve engaging a shoulder on the fibre retainer 6, not shown in the drawing, while said arrangement in respect of the spherical lens 4 can be constituted by a threaded spigot threaded into the connector element 10 and having at its surface adapted to engage the spherical lens 4 a ring consisting of elastic material elastically forcing the spherical lens 4 against the surface 14.

The conical surface 12 and the edge surface 16 formed with a radius are positioned in relation to each other so that the optical fibre 2 and the spherical lens 4 are positioned on the same optical axis and at such an axial distance from each other that the end surface of the optical fibre 2 is in the focus of the spherical lens 4, when the spherical reference surface 8 and the spherical lens 4 engage their respective surfaces. Thus, the optical connection between the optical fibre 2 and the spherical lens 4 is established through a substantially cylindrical opening 18 in the connector element 10, said opening 18 extending between the end surface 8 of the retainer 6 and the spherical lens 4.

As a consequence of the described engagement between the end surface 8 of the retainer 6 and the engagement surface 12 of the connector element 10 there is provided an extremely accurate determination of the position of the retainer 6 in the connector element 10 with regard to the axial position of the retainer as well as the radial position of the retainer in the connector element 10.

Figure 2:
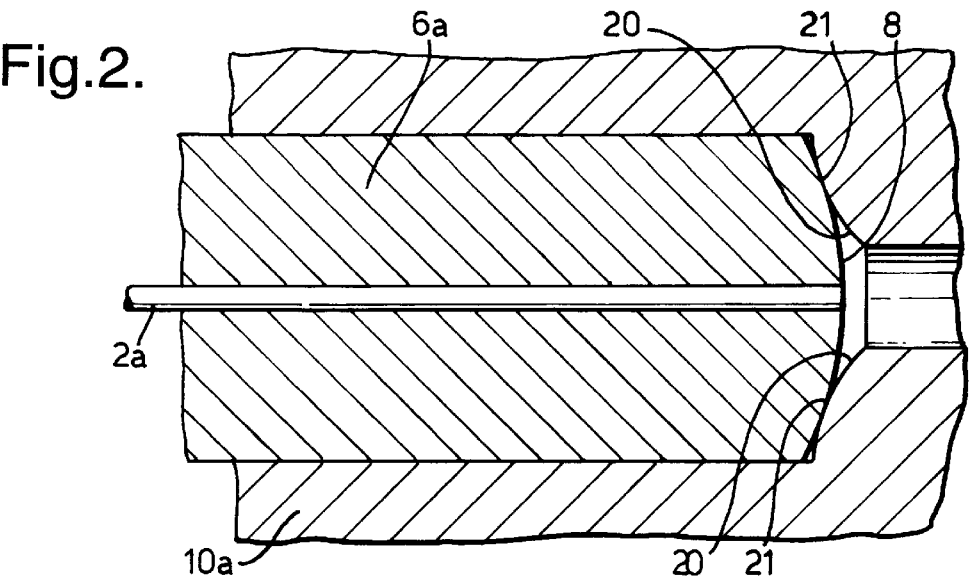
FIGS. 2–4 show details of modified embodiments of the device according to the invention corresponding to FIG. 1b.

Like the embodiment of the device according to the invention shown in FIGS. 1a and 1b the embodiment of the device shown in FIG. 2 comprises a retainer 6a for an optical fibre 2a. Like the embodiment according to FIG. 1a and 1b the retainer 6a has a spherical end surface 8a. The device according to FIG. 2 differs from the device according to FIGS. 1a and 1b with regard to the design of the engagement surface 20 of the connector element 10a, which surface is engaged by the spherical end surface 8a of the retainer 6a. Thus, the engagement surface 20 is in the embodiment according to FIG. 2 tapering in a funnel-shaped way from the end surface 8a of the retainer 6a at a somewhat convex shape of said surface. This provides for an annular, substantially line-shaped engagement surface 21 between the end surface 8a and the engagement surface 20, which is more narrow than the engagement surface 14 in the embodiment according to FIGS. 1a and 1b thereby providing for an even more accurately defined position of the retainer 6a in the connector element 10a.

Figure 3:
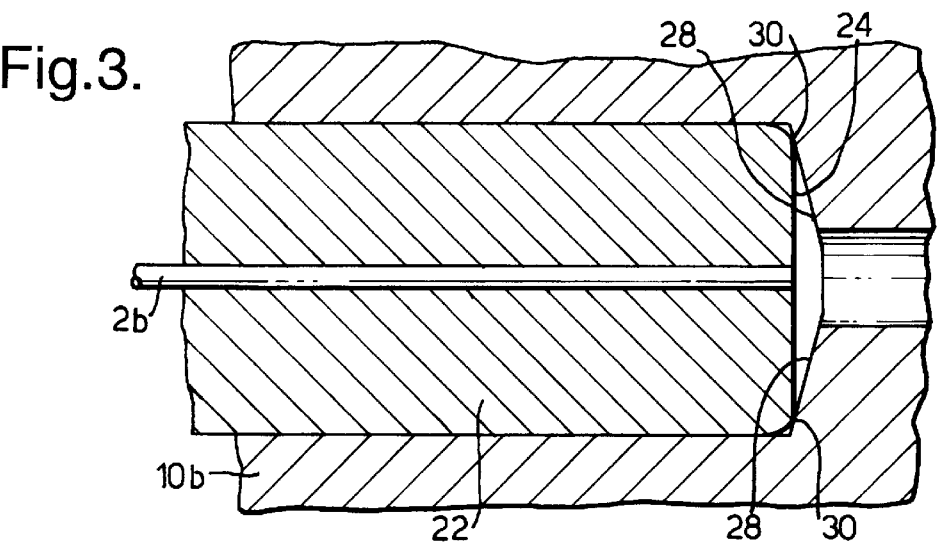

The embodiment of the device according to the invention shown in FIG. 3 comprises a retainer 22 for the optical fibre 2b, in which the end surface 24 of the retainer 22 is of substantially flat design having an outer edge portion 26 formed with a radius. Preferably, the radius of the outer edge portion 26 is about 0.1 mm. The engagement surface 28 of the connector element 6b is of substantially the same design as the engagement surface 12 in the embodiment according to FIGS. 1a and 1b, i.e. the engagement surface 28 is an annular, conical surface having a cone angle of 172–174°. Also in this embodiment of the device according to the invention there is provided between the retainer 22 and the connector element 6b an annular, narrow, substantial line-shaped engagement surface 30 which in an extremely accurately defined way defines the position of the retainer 22 in the connector element 6b with regard to the position in the axial direction as well as the position in the radial direction.

Figure 4:
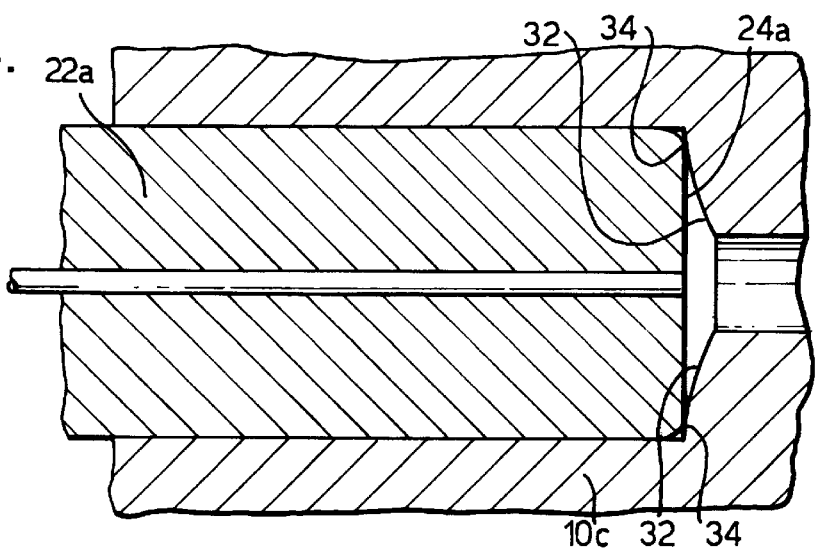

In the embodiment according to FIG. 4 the retainer 22a is designed in the same way as the retainer 22 according to the embodiment of FIG. 3, i.e. the retainer has a flat end surface 24a with an outer edge portion 26a formed with a radius. In this embodiment of the device according to the invention the engagement surface 32 of the connector element 6c is in a funnel-shaped way tapering in the direction from the retainer 22a at a somewhat convex design. In this respect the embodiment according to FIG. 4 is an agreement with the embodiment according to FIG. 2, even if the convex surface 32 forms a somewhat greater angle with the diametrical plane than the surface 20 in the embodiment according to FIG. 2. Also in the embodiment according to FIG. 4 there is provided an annular, narrow, substantially line-shaped engagement surface 34 between the retainer 22a and the engagement surface 32 of the connector element 6c.

The invention can be modified within the scope of the following claims and is applicable in different combinations of connections between optical fibres and other optical elements.

We claim:

1. A device for optical connection of an optical fibre with another optical element, for example a lens comprising a substantially sleeve-shaped retainer for fixing the optical fibre in a predetermined position in relation to reference surfaces on the retainer, said reference surfaces comprising an end surface on the retainer at which the end surface of the optical fibre is intended to be positioned, and further comprising a connector element having engagement surfaces adapted to engage the reference surfaces of the retainer for defining the position of the retainer and thereby the optical fibre in relation to the device, in which the engagement surfaces of the connector element comprises an engagement surface adapted to engage the end surface of the retainer, characterized in that the engagement surface of the connector element, which is adapted to engage the end surface of the retainer is constituted by a funnel-shaped surface tapering in the direction from the end surface of the retainer.

2. A device as claimed in claim 1, characterized in that the funnel-shaped surface is of conical design.

3. A device as claimed in claim 2, characterized in that the conical surface has a cone angle exceeding 90'.

4. A device as claimed in claim 3, characterized in that the conical surface has a cone angle of about 172°.

5. A device as claimed in claim 1, characterized in that the funnel-shaped surface is of convex shape.

6. A device as claimed in claim 1, characterized in that the end surface of the retainer engages the engagement surface of the retainer element at an annular, narrow, substantially line-shaped engagement surface.

7. A device as claimed in claim 6, characterized in that the end surface of the retainer, which engages the engagement surface of the connector element is of substantially spherical shape.

8. A device as claimed in claim 1, characterized in that the end surface of the retainer, which engages the engagement surface of the connector element is of substantially flat shape.

9. A device as claimed in claim 8, characterized in that the substantially flat end surface of the retainer has an outer edge portion formed with a radius.

10. A device as claimed in claim 1, characterized in that the connector element has a surface for defining the position of the other optical element, for example the lens, in relation to the end surface of the retainer.

11. A device as claimed in claim 10, in which the other optical element is constituted by a spherical lens, characterized in that the surface of the connector element for defining the position of the spherical lens in relation to the end surface of the retainer is constituted by a circular edge surface formed with a radius.

12. A device as claimed in claim 11, characterized in that the circular edge surface is formed with a radius having a magnitude of about 0.25 mm.

13. A device as claimed in claim 1, characterized in that the connector element is formed with an opening extending between the end surface of the retainer and the other optical element.

14. A device as claimed in claim 5, characterized in that the end surface of the retainer engages the engagement surface of the retainer element at an annular, narrow, substantially line-shaped engagement surface.

15. A device as claimed in claim 6, characterized in that the end surface of the retainer, which engages the engagement surface of the connector element is of substantially flat shape.

16. A device as claimed in claim 9, characterized in that the connector element has a surface for defining the position of the other optical element, for example the lens, in relation to the end surface of the retainer.

17. A device as claimed in claim 16, in which the other optical element is constituted by a spherical lens, characterized in that the surface of the connector element for defining the position of the spherical lens in relation to the end surface of the retainer is constituted by a circular edge surface formed with a radius.

18. A device as claimed in claim 17, characterized in that the circular edge surface is formed with a radius having a magnitude of about 0.25 mm.

19. A device as claimed in claim 2, characterized in that the connector element is formed with an opening extending between the end surface of the retainer and the other optical element.

20. A device as claimed in claim 18, characterized in that the connector element is formed with an opening extending between the end surface of the retainer and the other optical element.

* * * * *